United States Patent
Nagaoka et al.

(10) Patent No.: US 9,624,856 B2
(45) Date of Patent: Apr. 18, 2017

(54) EXHAUST GAS PURIFICATION SYSTEM AND EXHAUST GAS PURIFICATION METHOD

(71) Applicant: ISUZU MOTORS LIMITED, Tokyo (JP)

(72) Inventors: Daiji Nagaoka, Kamakura (JP); Takayuki Sakamoto, Fujisawa (JP)

(73) Assignee: ISUZU MOTORS LIMITED, Tokyo (JP)

( * ) Notice: Subject to any disclaimer, the term of this patent is extended or adjusted under 35 U.S.C. 154(b) by 1 day.

(21) Appl. No.: 14/439,769

(22) PCT Filed: Nov. 19, 2013

(86) PCT No.: PCT/JP2013/081101
§ 371 (c)(1),
(2) Date: Apr. 30, 2015

(87) PCT Pub. No.: WO2014/080877
PCT Pub. Date: May 30, 2014

(65) Prior Publication Data
US 2015/0292425 A1    Oct. 15, 2015

(30) Foreign Application Priority Data
Nov. 26, 2012  (JP) ................ 2012-257190

(51) Int. Cl.
*F01N 3/00* (2006.01)
*F01N 3/02* (2006.01)
(Continued)

(52) U.S. Cl.
CPC .......... *F02D 41/029* (2013.01); *F01N 3/023* (2013.01); *F01N 3/0253* (2013.01); *F01N 3/035* (2013.01);
(Continued)

(58) Field of Classification Search
CPC ........ F01N 11/00; F01N 3/023; F01N 3/0253; F01N 3/035; F02D 21/08; F02D 41/055;
(Continued)

(56) References Cited

U.S. PATENT DOCUMENTS 7,266,943 B2 * 9/2007 Kammel ............ B01D 53/9409
                                                          60/297
8,528,320 B2 * 9/2013 Nagaoka ............... F01N 3/0253
                                                          60/274

FOREIGN PATENT DOCUMENTS

DE    10 2010 017 575 A1    2/2012
JP    2007-56750             3/2007
(Continued)

OTHER PUBLICATIONS

International Search Report mailed on Mar. 4, 2014 in corresponding International Patent Application No. PCT/JP2013/081101.
(Continued)

*Primary Examiner* — Thai Ba Trieu
*Assistant Examiner* — Diem Tran
(74) *Attorney, Agent, or Firm* — Staas & Halsey LLP

(57) ABSTRACT

An exhaust gas purification system with a diesel particulate filter in an exhaust passage of an internal combustion engine. A surface filtration cake layer formation enhancement control or a particulate matter generation amount reduction control is temporarily performed immediately after a forced regeneration treatment on the diesel particulate filter. The system and a method are directed to a particulate matter slip-through phenomenon in which the particulate matter slip-through amount temporarily increases immediately after particulate matter re-combustion in a forced regeneration treatment on the diesel particulate filter. The diesel particulate filter is disposed in the exhaust passage of the internal combustion engine and reduces the total amount of particulate matter emitted to the atmosphere immediately (Continued)

after the particulate matter re-combustion in the forced regeneration treatment on the diesel particulate filter.

13 Claims, 9 Drawing Sheets

(51) Int. Cl.
  F02D 41/02 (2006.01)
  F02D 41/40 (2006.01)
  F02D 41/00 (2006.01)
  F01N 3/025 (2006.01)
  F01N 3/035 (2006.01)
  F01N 3/023 (2006.01)
  F02D 21/08 (2006.01)
  F01N 9/00 (2006.01)
  F01N 11/00 (2006.01)
  F02M 26/15 (2016.01)
  F02M 26/05 (2016.01)
  F02M 26/23 (2016.01)

(52) U.S. Cl.
  CPC .............. F01N 9/002 (2013.01); F01N 11/00 (2013.01); F02D 21/08 (2013.01); F02D 41/0055 (2013.01); F02D 41/0235 (2013.01); F02D 41/40 (2013.01); F02M 26/15 (2016.02); F02D 2200/0812 (2013.01); F02M 26/05 (2016.02); F02M 26/23 (2016.02); Y02T 10/44 (2013.01); Y02T 10/47 (2013.01)

(58) Field of Classification Search
  CPC .... F02D 41/029; F02D 41/0235; F02D 41/40; Y02T 10/44; Y02T 10/47
  USPC .......................... 60/278, 285, 295, 297, 311
  See application file for complete search history.

(56) References Cited

FOREIGN PATENT DOCUMENTS

| | | |
|---|---|---|
| JP | 2007-230302 | 9/2007 |
| JP | 2009-7982 | 1/2009 |
| JP | 2010-31799 | 2/2010 |
| JP | 2011-149357 | 8/2011 |
| JP | 2012-154255 | 8/2012 |

OTHER PUBLICATIONS

Japanese Platform for Patent Information English Abstract of Japanese Publication No. 2007-56750, Published Mar. 8, 2007.
Japanese Platform for Patent Information English Abstract of Japanese Publication No. 2007-230302, Published Sep. 13, 2007.
Japanese Platform for Patent Information English Abstract of Japanese Publication No. 2010-31799, Published Feb. 12, 2010.
Japanese Platform for Patent Information English Abstract of Japanese Publication No. 2011-149357, Published Aug. 4, 2011.
Extended European Search Report dated Jun. 28, 2016 in corresponding European Patent Application No. 13857648.3.

* cited by examiner

EXHAUST GAS PURIFICATION SYSTEM AND EXHAUST GAS PURIFICATION METHOD

CROSS-REFERENCE TO RELATED APPLICATIONS

This application is a U.S. National Stage Application, which claims the benefit under 35 U.S.C. §371 of PCT International Patent Application No. PCT/JP2013/081101, filed Nov. 19, 2013, which claims the foreign priority benefit under 35 U.S.C. §119 of Japanese Patent Application No. 2012-257190, filed Nov. 26, 2012, the contents of which are incorporated herein by reference.

TECHNICAL FIELD

The present invention relates to an exhaust gas purification system and an exhaust gas purification method capable of preventing particulate matter ("PM") slip-through which occurs in an exhaust gas purification system including a diesel particulate filter ("DPF") disposed in an exhaust passage of an internal combustion engine immediately after PM re-combustion in a forced regeneration treatment on the DPF, to reduce the total amount of PMs emitted to the atmosphere.

BACKGROUND ART

To remove PMs in exhaust gas emitted through an exhaust passage of an internal combustion engine to the outside of a vehicle, an exhaust gas purification system has been used in which a DPF that traps PMs is provided in the exhaust passage of the internal combustion engine. With the increase in amount of PMs trapped in the DPF, the pressure drop across the DPF increases to deteriorate the fuel-efficiency, or the amount of PMs which exceed the limitation of the PM trap and which slip through the DPF increases to deteriorate the emission performance. For these reasons, a forced regeneration treatment for the re-combustion of the trapped PMs is performed on the DPF by raising the temperature of the DPF at regular intervals to reduce the amount of PMs emitted to the atmosphere. By employing the DPF, the amount of PMs emitted to the atmosphere is reduced to a level of about 1/100.

However, as shown in FIG. 11, the DPF has a problem in that a phenomenon occurs in which the amount of PMs emitted to the atmosphere temporarily increases (the DPF outlet soot concentration increases in FIG. 11) because of "PM slip-through (soot break-through)" in which PMs pass through the DPF after the re-combustion of PMs in the forced regeneration treatment on the DPF. This phenomenon is thought to occur as follows.

For example, in a wall flow type DPF, when PMs pass through a wall surface that sections cells, the PMs are trapped on the wall surface. Here, PMs with relatively large particle sizes do not pass through the wall surface, but are attached to a front side (upstream side) of the wall surface to form a surface filtration cake layer. The formation of the surface filtration cake layer increases the pressure drop to some degree, but simultaneously the PM trap efficiency is also improved. However, the surface filtration cake layer is combusted and lost by the PM re-combustion in the forced regeneration treatment on the DPF, and hence the PM slip-through (blow off) occurs in which the PM trap efficiency is temporarily lowered. As a result, PMs are not trapped by the DPF, but slip through the DPF, so that the amount of PMs emitted to the atmosphere increases temporarily.

Note that, when the temperature of the DPF raised by the forced regeneration treatment drops after the PM re-combustion, PMs are again trapped by the DPF to form the surface filtration cake layer again on the front side of the wall surface. With the growth of the surface filtration cake layer, the PM trap efficiency increases, which leads to the decrease in the PM slip-through amount, and in turn, the decrease in the amount of PMs emitted to the atmosphere.

The degree of the deterioration in the PM removal due to the temporary increase in the amount of PMs emitted to the atmosphere caused by the PM slip-through is not detectable with eyes. However, the PM slip-through may cause the deterioration in the K-factor, which is a deterioration factor listed in an application for the certification of the emission performance, and the like. Hence, a countermeasure has to be taken against the PM slip-through.

As a countermeasure against the PM slip-through, the present inventors have proposed a DPF regenerator as described in Japanese patent application Kokai publication No. 2011-149357, for example. Specifically, to reduce the soot break-through in which PMs slip through a DPF because of the decrease (blow-off) in the PM trap efficiency immediately after DPF regeneration in an exhaust gas apparatus in which the DPF is provided in an exhaust gas flow passage of an internal combustion engine, post injection which is performed in a forced regeneration of the DPF is prohibited and the forced regeneration of the DPF is stopped at a time point where the PM concentration detected downstream of the DPF is not lower than a predetermined value and the blow-off occurs in the DPF. Thus, the temporary increase in the amount of PMs emitted to the atmosphere due to the post injection is suppressed.

In this DPF regenerator, the post injection of the forced regeneration treatment on the DPF is stopped at the same time as the occurrence of the blow-off in the DPF. This prevents PMs generated because of the post injection performed for the forced regeneration treatment on the DPF from being emitted to the atmosphere during the blow-off immediately after the PM re-combustion. Thus, the increase in the amount of PMs emitted to the atmosphere is suppressed.

PRIOR ART DOCUMENT

Patent Document 1: Japanese patent application Kokai publication No. 2011-149357

SUMMARY OF THE INVENTION

The present inventors have found that it is necessary to perform not only the passive countermeasure proposed for the DPF apparatus in which the post injection performed in the forced regeneration treatment on the DPF is stopped at the same time as the completion of the PM re-combustion to eliminate the amount of PMs generated by the post injection at the occurrence of the PM slip-through phenomenon, but also an active suppression of the increase in the amount of PMs emitted to the atmosphere after the completion of the PM re-combustion in the forced regeneration treatment on the DPF. This finding leads the present inventors to the present invention.

The present invention has been made in view of the above-described matters, and an object of the present invention is to provide an exhaust gas purification system and an exhaust gas purification method which are directed to the PM slip-through phenomenon in which the PM slip-through amount temporarily increases immediately after PM re-combustion in a forced regeneration treatment on a DPF in an exhaust gas purification system including the DPF disposed in an exhaust passage of an internal combustion engine, and which are capable of reducing the total amount of PMs emitted to the atmosphere immediately after the PM re-combustion in the forced regeneration treatment on the DPF, and reducing the total amount of PMs emitted to the atmosphere.

An exhaust gas purification system according to the present invention to achieve the above-described object is an exhaust gas purification system including a DPF disposed in an exhaust passage of an internal combustion engine, wherein the exhaust gas purification system is configured to temporarily perform a surface filtration cake layer formation enhancement control or a PM generation amount reduction control, immediately after PM re-combustion in a forced regeneration treatment on the DPF.

Note that the term "temporarily" indicates a period having a relationship with a period for which the phenomenon (blow-off) in which the amount of PMs emitted to the atmosphere temporarily increases occurs. As the temporary period, it is possible to employ a period of a preset time (for example, 5 minutes or the like), a period until a cumulative PM trap amount becomes not less than a preset amount, a period until a PM trap efficiency becomes not less than a predetermined ratio, a period until a PM slip-through amount becomes not less than a predetermined amount, a period until a PM slip-through ratio becomes not less than a predetermined value, or the like.

With this configuration, the phenomenon (blow-off) in which the amount of PMs passing through the DPF temporarily increases, and the amount of PMs emitted to the atmosphere temporarily increases immediately after the PM re-combustion in the forced regeneration treatment of PMs in the DPF can be treated as follows. Specifically, during the period for which this phenomenon continues, early formation and growth of the surface filtration cake layer on the wall surface of the DPF are enhanced immediately after the PM re-combustion of the forced regeneration treatment by the surface filtration cake layer formation enhancement control in which the PM generation amount is increased from that generated during an ordinary operation. In this manner, the PM slip-through amount can be reduced, and the total amount of PMs emitted to the atmosphere can be reduced.

Alternatively, by the PM generation amount reduction control in which the PM generation amount is reduced from that generated during an ordinary operation, the PM generation amount in the internal combustion engine is reduced for a temporary period until the surface filtration cake layer has grown. Thus, the amount of PMs flowing into the DPF is reduced, and the DPF slip-through amount is reduced, so that the total amount of PMs emitted to the atmosphere can be reduced.

When the above-described exhaust gas purification system is configured such that the surface filtration cake layer formation enhancement control is any one of a PM generation amount increase control by increasing an exhaust gas recirculation ("EGR") rate, a retard control in which fuel injection timing is retarded in in-cylinder fuel injection, or an air-fuel ratio richness control in which an air-fuel ratio is made rich in in-cylinder fuel injection, the following effects can be achieved.

Specifically, with this configuration, when the PM generation amount increase control by increasing an EGR rate is performed, the in-cylinder combustion temperature is lowered by increasing the EGR rate, so that the amount of soot formed is slightly increased, and HCs are adsorbed onto the soot particles by increasing the HC concentration to increase the particle diameters of the soot. Thus, the formation of the surface filtration cake layer can be enhanced.

Meanwhile, when each of the retard control in which fuel injection timing is retarded in in-cylinder fuel injection and the air-fuel ratio richness control (rich-spike control or the like) in which an air-fuel ratio is made rich in in-cylinder fuel injection is conducted, the HC components (hydrocarbon components) in the exhaust gas are increased by the control, and the HCs are attached to the PMs to increase the particle diameters. This can facilitate the trapping of the PMs on the wall surface of the DPF, and hence the formation of the surface filtration cake layer can be enhanced.

Note that, to increase the effect to enhance the formation of the surface filtration cake layer, it is more preferable to monitor the temperature of the DPF and perform each of the retard control and the air-fuel ratio richness control at a temperature where the HCs do not vaporize into a gas phase state, and the HCs can be attached to the wall surface of the DPF, while remaining in a liquid phase state in which the HCs can be easily attached to the PMs.

When the above-described exhaust gas purification system is configured such that the PM generation amount reduction control is a PM generation amount limiting control by decreasing an EGR rate, the in-cylinder combustion temperature can be raised by the PM generation amount limiting control by decreasing an EGR rate to reduce the PM generation amount, so that the amount of PMs slipping through the DPF can be reduced. Thus, the PM slip-through amount can be reduced, until the surface filtration cake layer is formed to some extent.

The above-described exhaust gas purification system is configured such that, in the surface filtration cake layer formation enhancement control, the retard control is performed, when an engine torque of the internal combustion engine is lower than a preset first setting value, the EGR rate increase control is performed, when the engine torque is not lower than the first setting value but lower than a preset second setting value, and the air-fuel ratio richness control is performed, when the engine torque is not lower than the second setting value. With this configuration, an optimum surface filtration cake layer formation enhancement control can be selected according to the engine torque (engine output) of the internal combustion engine. Hence, while adverse influences on the engine torque and the emission performance are reduced, the formation of the surface filtration cake layer can be enhanced efficiently, and the total amount of PMs emitted to the atmosphere can be reduced.

The above-described exhaust gas purification system is configured such that
the PM generation amount reduction control is performed, when a PM generation amount which is a generation amount of PMs generated in the internal combustion engine exceeds a preset acceptable PM generation amount, or when a PM slip-through amount which is an amount of PMs passing through the DPF exceeds a preset acceptable PM slip-through amount, immediately after the PM re-combustion in the forced regeneration treatment on the DPF. With this configuration, the PM generation amount reduction control is performed on the basis of the PM generation amount or the PM slip-through amount. Hence, the total amount of PMs emitted to the atmosphere can be reduced reliably.

The PM generation amount, which is the generation amount of PMs generated in the internal combustion engine immediately after the PM re-combustion of the forced regeneration treatment on the DPF, is preferably calculated as follows. Specifically, data on the PM generation amount are acquired in advance on the basis of an engine operation state of the internal combustion engine to create a PM generation amount database. Then, the PM generation amount is calculated from an engine operation state immediately after the forced regeneration treatment on the DPF with reference to the PM generation amount database. With this configuration, the PM generation amount can be precisely calculated on the basis of the preset PM generation amount database.

Meanwhile, the PM slip-through amount, which is an amount of PMs passing through the DPF immediately after the PM re-combustion of the forced regeneration treatment on the DPF, is preferably calculated as follows. Specifically, data on the PM trap efficiency from the time point immediately after the PM re-combustion are acquired in advance on the basis of the cumulative PM trap amount to create a PM trap efficiency database. Then, the PM generation amount is calculated from the engine operation state immediately after the forced regeneration treatment on the DPF with reference to the PM generation amount database. In addition, the PM trap amount is calculated from the PM trap efficiency (which is derived from the preceding cumulative PM trap amount), and a cumulative PM trap amount which is a cumulative value of the PM trap amount is calculated. Then, the PM slip-through amount is calculated by subtracting the PM trap amount from the PM generation amount. With this configuration, the PM slip-through amount can be calculated precisely on the basis of the preset PM generation amount database and the preset PM trap efficiency database.

In addition, an exhaust gas purification method of the present invention to achieve the above-described object is an exhaust gas purification method including purifying exhaust gas of an internal combustion engine with a DPF, wherein a surface filtration cake layer formation enhancement control or a PM generation amount reduction control is temporarily performed immediately after PM re-combustion in a forced regeneration treatment on the DPF.

In the exhaust gas purification method, any one of a PM generation amount increase control by increasing an EGR rate, a retard control in which fuel injection timing is retarded in in-cylinder fuel injection, and an air-fuel ratio richness control in which an air-fuel ratio is made rich in in-cylinder fuel injection is performed as the surface filtration cake layer formation enhancement control.

In addition, in the above-described exhaust gas purification method, a PM generation amount limiting control by decreasing an EGR rate is performed as the PM generation amount reduction control.

Moreover, in the surface filtration cake layer formation enhancement control in the above-described exhaust gas purification method, the retard control is performed, when an engine torque of the internal combustion engine is lower than a preset first setting value, the EGR rate increase control is performed, when the engine torque is not lower than the first setting value but lower than a preset second setting value, and the air-fuel ratio richness control is performed, when the engine torque is not lower than the second setting value.

In addition, in the above-described exhaust gas purification method, the PM generation amount reduction control is performed, when a PM generation amount which is a generation amount of PMs generated in the internal combustion engine exceeds a preset acceptable PM generation amount, or when a PM slip-through amount which is an amount of PMs passing through the DPF exceeds a preset acceptable PM slip-through amount, immediately after the PM re-combustion in the forced regeneration treatment on the DPF.

These exhaust gas purification methods can achieve the same effects as those of the above-described exhaust gas purification systems.

The exhaust gas purification system and the exhaust gas purification method of the present invention are directed to the PM slip-through (blow-off) phenomenon in which the PM slip-through amount temporarily increases immediately after the PM re-combustion of the forced regeneration treatment on a DPF in an exhaust gas purification system comprising the DPF disposed in an exhaust passage of an internal combustion engine. According to the exhaust gas purification system and the exhaust gas purification method of the present invention, the early reformation and growth of the surface filtration cake layer on the wall surface of the DPF are temporarily enhanced by the surface filtration cake layer formation enhancement control in which the PM generation amount is increased, or the PM generation amount from the internal combustion engine is reduced and the amount of PMs flowing into the DPF is reduced by the PM generation amount reduction control in which the PM generation amount is reduced for a temporary period until the surface filtration cake layer is formed again and has grown. Thus, it is possible to reduce the total amount of PMs emitted to the atmosphere immediately after the PM re-combustion in the forced regeneration treatment on the DPF, and reduce the total amount of PMs emitted to the atmosphere.

BRIEF DESCRIPTION OF THE DRAWINGS

Hereinafter, an exhaust gas purification system and an exhaust gas purification method of an embodiment according to the present invention are described with reference to the drawings. As shown in FIG. 1, an exhaust gas purification system 1 of this embodiment includes an intake passage 12 connected to an intake manifold 11a of an engine main body 11 of an engine (internal combustion engine) 10, an exhaust passage 13 connected to an exhaust manifold 11b, and an EGR passage 14 which connects the exhaust manifold 11b and the intake manifold 11a to each other.

Figure 1:
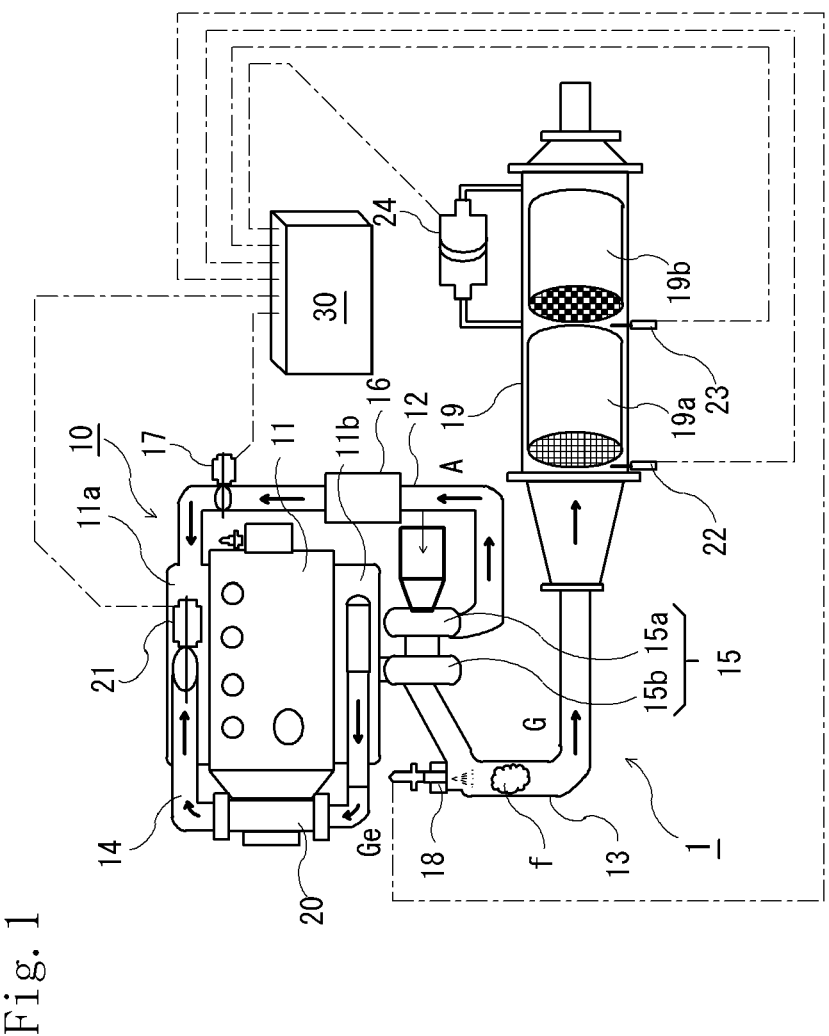
FIG. 1 shows a configuration of an exhaust gas purification system of an embodiment according to the present invention.

The intake passage 12 is provided with a compressor 15a of a turbosupercharger (turbo charger) 15, an intercooler 16, and an intake throttle (intake valve) 17 in this order from an upstream side. Intake air A passes thorough an air cleaner and an intake air mass flow sensor (MAF), is compressed by the compressor 15a, and further cooled in the intercooler 16, passes through the intake throttle 17 which regulates the amount of the intake air, and is supplied to the intake manifold 11a.

Meanwhile, the exhaust passage 13 is provided with a turbine 15b of the turbosupercharger 15, an in-exhaust passage fuel injection valve 18, and an exhaust gas purification apparatus 19, in this order from the upstream side. The exhaust gas purification apparatus 19 includes an oxidation catalyst (DOC: diesel oxidation catalyst) 19a on the upstream side and a DPF (diesel particulate filter) 19b on the downstream side. PMs (particulate matters) in exhaust gas G are trapped in the DPF 19b. When the PM trap amount increases, a forced regeneration treatment of the DPF 19b is performed. In the PM re-combustion in the forced regeneration treatment on the DPF 19b, fuel f is supplied into the exhaust gas G from the in-exhaust passage fuel injection valve 18. The fuel f is oxidized with the oxidation catalyst 19a, and the temperatures of the exhaust gas G and the DPF 19b are raised by the heat of combustion of the fuel f to conduct a re-combustion treatment of the PMs trapped in the DPF 19b.

Meanwhile, the EGR passage 14 is provided with an EGR cooler 20 and an EGR valve 21 in this order from the upstream side. During EGR (exhaust gas recirculation), EGR gas Ge, which is part of the exhaust gas G, is introduced through the exhaust manifold 11b. The EGR gas Ge is cooled in the EGR cooler 20, then passes through the EGR valve 21 which regulates the amount of the EGR gas, and then is supplied to the intake manifold 11a.

In addition, a first exhaust gas temperature sensor 22 is provided on an upstream side of the oxidation catalyst 19a, a second exhaust gas temperature sensor 23 is provided between the oxidation catalyst 19a and the DPF 19b, and a differential pressure sensor 24 is provided for measuring a differential pressure between the upstream side and the downstream side of the DPF 19b. Signals detected by these sensors are inputted to a controlling device 30 called an engine control unit (ECU) which controls operation of the engine 10 and the exhaust gas purification system 1. The controlling device 30 receives signals detected by these sensors and other various sensors such as an accelerator sensor, an engine rotation sensor, and a cooling water sensor, and controls the intake throttle 17, the in-exhaust passage fuel injection valve 18, the EGR valve 21, and the like according to operation conditions of the engine 10, a state of the exhaust gas G, and the like.

The DPF 19b disposed in the exhaust passage 13 of the exhaust gas purification system 1 traps PMs contained in the exhaust gas G flowing through the exhaust passage 13. Here, as the trap amount of PMs trapped in the DPF 19b increases, the pressure drop across the DPF 19b increases, which causes lowering of the fuel-efficiency and the like, and the trap amount exceeds the PM trap capacity, so that the amount of PMs that slip through the DPF 19b increases. For this reason, the DPF 19b is regenerated by performing the forced regeneration treatment for the re-combustion of the trapped PMs at regular intervals or upon detection that the PM trap amount exceeds an acceptable amount or that the differential pressure across the DPF 19b exceeds an acceptable amount.

However, immediately after the re-combustion of the trapped PMs by the forced regeneration treatment on the DPF 19b, a surface filtration cake layer, which is an aggregate of PMs having large particle diameters such as HCs and is formed on a front side of a wall surface of the DPF 19b through which the exhaust gas G passes is lost, and hence a blow-off phenomenon occurs temporarily in which PMs slip through the DPF 19b.

Figure 2:
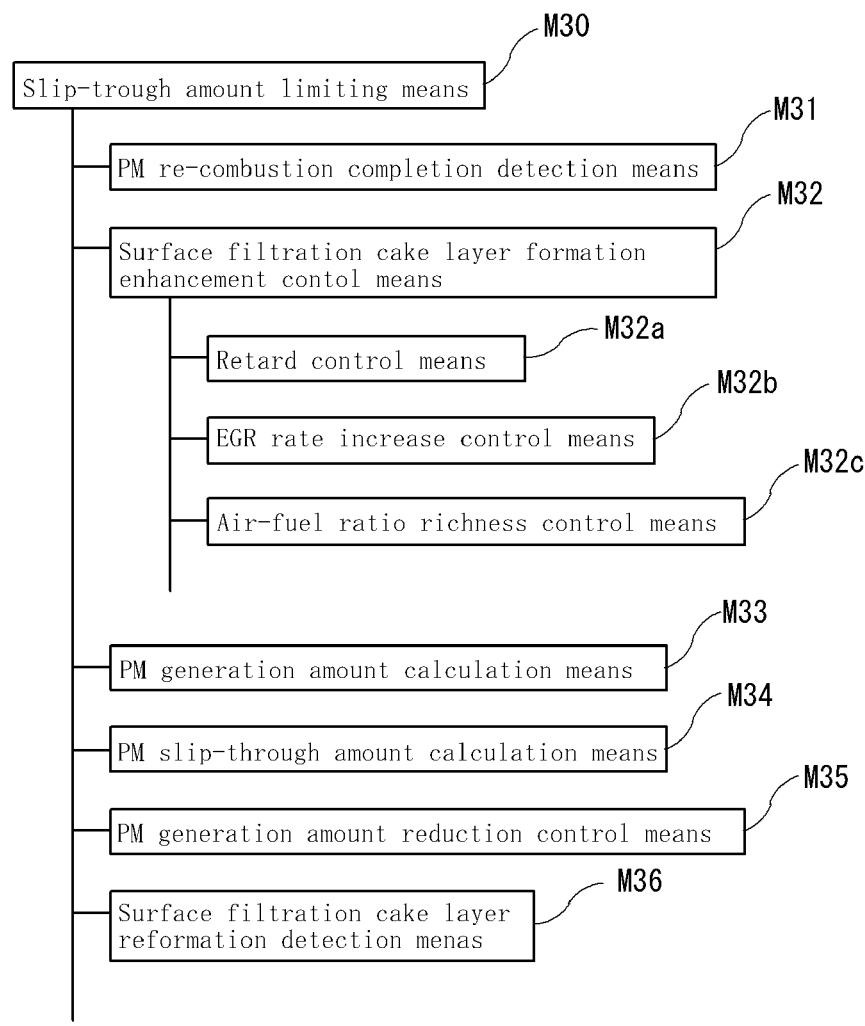
FIG. 2 shows a configuration of control means of the exhaust gas purification system of an embodiment according to the present invention.

Here, to address the phenomenon in which the amount of PMs passing through the DPF 19b temporarily increases, and consequently the amount of PMs emitted to the atmosphere temporarily increases, immediately after the PM re-combustion by the forced regeneration treatment of PMs in the DPF 19b, the controlling device 30 of the present invention includes, as shown in FIG. 2, slip-through amount limiting means M30 as means for performing the surface filtration cake layer formation enhancement control or the PM generation amount reduction control, immediately after the forced regeneration treatment on the DPF 19b temporarily until the surface filtration cake layer is formed again and has grown to a certain extent. The slip-through amount limiting means M30 includes PM re-combustion completion detection means M31, surface filtration cake layer formation enhancement control means M32, PM generation amount calculation means M33, PM slip-through amount calculation means M34, PM generation amount reduction control means M35, and surface filtration cake layer reformation detection means M36.

The PM re-combustion completion detection means M31 is means for detecting whether the PM re-combustion by the forced regeneration treatment of PMs in the DPF 19b is completed. For example, the PM re-combustion completion detection means M31 is configured to determine that the PM re-combustion is completed at a time point where a value $\Delta P$ detected by the differential pressure sensor 24 becomes smaller than a preset setting value $\Delta Pc$, or to determine that the PM re-combustion is completed at a time point where a PM concentration difference $\Delta Cpm$ across the DPF 19b or a PM trap efficiency $\eta y$ calculated from the PM concentration difference $\Delta Cpm$ becomes smaller than the corresponding preset value $\Delta Cpm1$ or $\eta y1$.

Meanwhile, the surface filtration cake layer formation enhancement control means M32 is means for performing a control for increasing the amount of PMs (main components thereof are HCs and the like) passing through the DPF 19b by increasing the amount (PM generation amount) of PMs in the exhaust gas G at an outlet of the engine 10. The surface filtration cake layer formation enhancement control enhances early formation and growth of the surface filtration cake layer on the wall surface of the DPF 19b immediately after the forced regeneration treatment. Thus, the PM slip-through amount Y is reduced, and the total amount of PMs emitted to the atmosphere is reduced. Note that the PM slip-through amount Y before the formation of the surface filtration cake layer is increased by performing the surface filtration cake layer formation enhancement control. However, since the surface filtration cake layer is formed early, the total amount of PMs emitted to the outside air is smaller than that in a conventional technology.

The surface filtration cake layer formation enhancement control means M32 includes retard control means M32a for monitoring a temperature of the DPF 19b and retarding fuel injection timing in in-cylinder fuel injection when the DPF temperature is not higher than a preset temperature, EGR rate increase control means M32b for increasing the PM generation amount by increasing an EGR rate, and air-fuel ratio richness control means M32c for monitoring the temperature of the DPF 19b and making an air-fuel ratio rich in in-cylinder fuel injection, when the DPF temperature is not higher than a preset temperature. By performing any of these means M32a, M32b, and M32c, the amount (PM generation amount) X of PMs in the exhaust gas G at the outlet of the engine 10 is increased.

The retard control means M32a monitors the temperature of the DPF 19b, and performs the retard control in which the fuel injection timing is retarded in in-cylinder fuel injection, when the DPF temperature is not higher than the preset temperature. Hence, the HC components in the exhaust gas G are increased at a DPF temperature where the HC components in the exhaust gas G do not vaporize into a gas phase state, and the particle diameters of the PMs are increased by attaching the HCs in the liquid phase state to the PMs. This can facilitate the trapping of the PMs on the wall surface of the DPF 19b. Hence, the formation of the surface filtration cake layer can be enhanced.

Meanwhile, in the case where the EGR rate increase control means M32b performs the control for increasing the PM generation amount X by increasing the EGR rate, an in-cylinder combustion temperature in a cylinder, the exhaust gas temperature, and the DPF temperature are lowered by increasing the EGR rate, and the PM generation amount X is increased. Thus, the PM trap efficiency ηy by the DPF 19b is increased, and the formation of the surface filtration cake layer can be enhanced.

Meanwhile, the air-fuel ratio richness control means M32c monitors the temperature of the DPF 19b, and performs the air-fuel ratio richness control (rich-spike control or the like) in which the air-fuel ratio is made rich in in-cylinder fuel injection when the DPF temperature is not higher than the preset temperature. In this case, as in the case of the retard control, the HC components in the exhaust gas G are increased at a DPF temperature where the HC components in the exhaust gas G do not vaporize into a gas phase state, and the particle diameters of the PMs are increased by attaching HCs in a liquid phase state to the PMs. This can facilitate the trapping of the PMs on the wall surface of the DPF 19b. Thus, the formation of the surface filtration cake layer can be enhanced.

In other words, the PMs are further converted to soot which is readily accumulated on a surface layer of the wall surface of the DPF 19b. PM particles which more readily form the surface filtration cake layer by being trapped on the wall surface are presumably wet PMs having relatively large particle diameters on which HCs and the like are adsorbed. In this respect, with the DPF temperature being monitored, the air-fuel ratio is made rich by temporarily retarding the injection timing or temporarily performing rich-spike, when the temperature drops. Thus, HC components are increased among the exhaust gas components, and the HCs are attached to PMs to increase the particle diameters, which facilitates the trapping of the PMs on the wall surface of the DPF 19b.

Note that, in addition to the above-described means M32a, M32b, and M32c, any means capable of making it easier for the PMs to be trapped on the front side of the wall surface of the DPF 19b, and thus enhancing the formation of the surface filtration cake layer, can be employed for the surface filtration cake layer formation enhancement control.

In addition, among these surface filtration cake layer formation enhancement controls, the retard control by the retard control means M32a is performed in a case of a low-load region where an engine torque T of the engine 10 is lower than a preset first setting value T1, and the change in the smoke concentration is insensitive to the EGR rate; the EGR rate increase control by the EGR rate increase control means M32b is performed in a case of a middle-load region where the engine torque T is not lower than the first setting value T1 but lower than a preset second setting value T2, and the change in the smoke concentration is sensitive to the EGR rate; and the air-fuel ratio richness control by the air-fuel ratio richness control means M32c is performed in a case of a high-load region where the engine torque T is not lower than the second setting value T2, and a change in the timing of the in-cylinder fuel injection or a change in the EGR rate tends to exert an influence on the power performance of the engine 10.

With this configuration, optimum means for the surface filtration cake layer formation enhancement control can be selected from the means M32a, M32b, and M32c according to the engine torque (engine output) of the engine 10. Hence, while adverse influences on the engine torque T and the emission performance are reduced, the formation of the surface filtration cake layer can be enhanced efficiently, and the total amount of PMs emitted to the atmosphere can be reduced.

Meanwhile, the PM generation amount calculation means M33 is means for calculating the PM generation amount X generated at the outlet of the engine 10 immediately after the forced regeneration treatment on the DPF 19b. Data on the PM generation amount X at the outlet of the engine 10, for example, at an outlet of the exhaust manifold 11b or the like are acquired in advance on the basis of the engine operation state of the engine 10, and a PM generation amount database is created. Then, with reference to the PM generation amount database, the PM generation amount X is calculated from an engine operation condition, for example, an engine rotation speed or an engine torque (or an in-cylinder fuel injection amount), immediately after the forced regeneration treatment on the DPF 19b. This makes it possible to precisely calculate the PM generation amount on the basis of the preset PM generation amount database.

Figure 5:
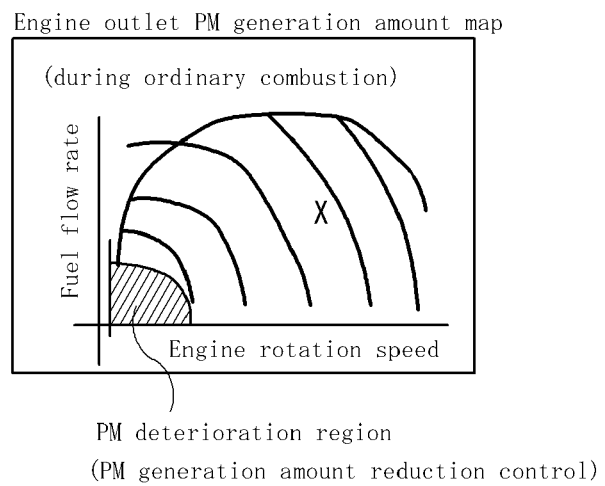
FIG. 5 is a schematic diagram of an engine outlet PM generation amount map during ordinary combustion.
Figure 6:
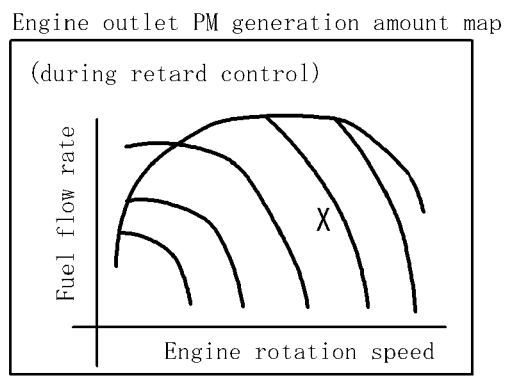
FIG. 6 is a schematic diagram of an engine outlet PM generation amount map during a retard control.
Figure 7:
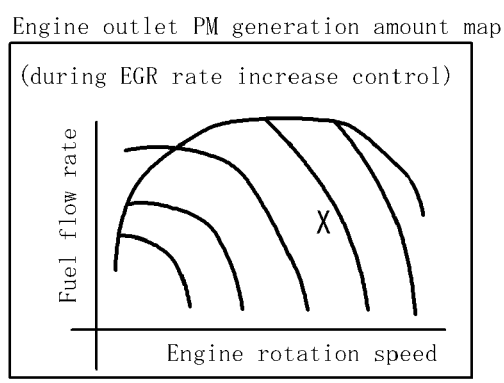
FIG. 7 is a schematic diagram of an engine outlet PM generation amount map during an EGR rate increase control.
Figure 8:
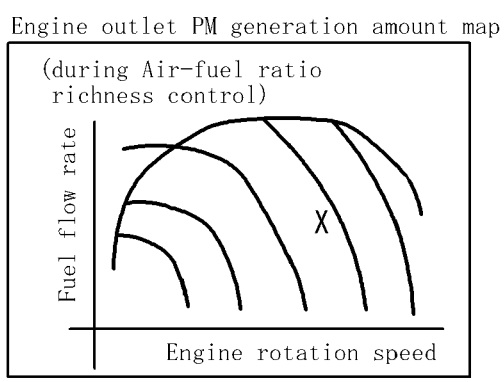
FIG. 8 is a schematic diagram of an engine outlet PM generation amount map during an air-fuel ratio richness control.

As examples of the database, FIG. 5 shows an engine outlet PM generation amount map during ordinary combustion, FIG. 6 shows an engine outlet PM generation amount map during a retard control, FIG. 7 shows an engine outlet PM generation amount map during an EGR rate increase control, and FIG. 8 shows an engine outlet PM generation amount map during an air-fuel ratio richness control. These engine outlet PM generation amount maps can be created by measuring the PM amount at the engine outlet with the engine rotation speed (the engine speed) and the fuel flow rate (equivalent to the engine torque or the load) being varied in a bench test or the like, or other methods. In other words, a map of the amount X of PMs generated at the engine outlet is experimentally created in advance.

Figure 9:
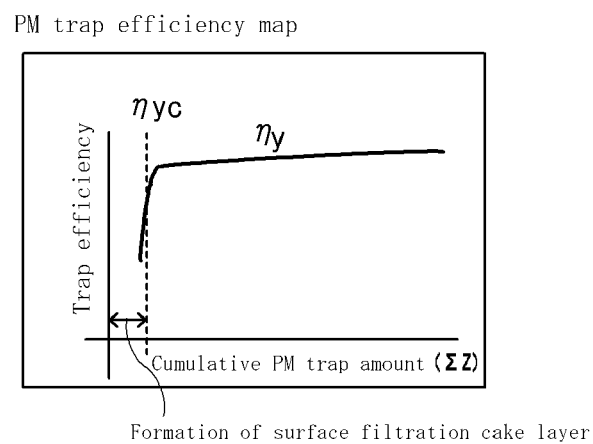
FIG. 9 is a schematic diagram of a PM trap efficiency map.

Meanwhile, the PM slip-through amount calculation means M34 is means for calculating the amount of PMs slipping through the DPF 19b, i.e., the PM slip-through amount Y. For calculating the PM slip-through amount Y, the PM generation amount X is multiplied by the PM trap efficiency ηy to calculate the PM slip-through amount Y (=X×ηy). A database of the PM trap efficiency ηy is created in advance. A relationship between the amount (PM trap amount) of PMs trapped in the DPF 19b and the ratio (PM trap efficiency) ηy of the PM trap amount Z to the PM generation amount X is created and used in the form of, for example, a PM trap efficiency map as shown in FIG. 9. Also for the PM trap efficiency map, the PM amounts before and after the DPF 19b are measured to determine the PM trap efficiency ηy in a bench test or the like, and the PM trap efficiency map is created on the basis of the cumulative PM trap amount ΣZ in the DPF 19b. In other words, a correlation map between the cumulative PM trap amount ΣZ and the trap efficiency ηy is experimentally created in advance. The PM trap efficiency ηy changes depending on the cumulative PM trap amount ΣZ.

The PM generation amount reduction control means M35 is means for performing a control for limiting the PM generation amount X in the engine 10, when the PM generation amount X exceeds a preset acceptable PM generation amount Xc, or when the PM slip-through amount Y exceeds a preset acceptable PM slip-through amount Yc, in a temporary period until the surface filtration cake layer has grown. As the PM generation amount reduction control, a control for limiting the PM generation amount X by decreasing the EGR rate is employed. By the control for limiting the PM generation amount X by decreasing the EGR rate, the in-cylinder combustion temperature is raised for a temporary period until the surface filtration cake layer is formed again and has grown to a preset extent. Thus, the PM generation amount X is reduced, and, in turn, the PM slip-through amount Y, which is the amount of PMs slipping through the DPF 19b, is reduced. In this manner, the total amount of PMs emitted to the atmosphere is reduced. Note that the PM generation amount limiting control by decreasing the EGR rate leads to the increase in amount of NOx emitted. This increase can be coped with by performing a control, such as increasing a reducing agent for a deNOx catalyst (for example, a urea SCR catalyst) during this period.

The surface filtration cake layer reformation detection means M36 is means for detecting that the surface filtration cake layer is formed again, and has grown to a preset extent. The surface filtration cake layer reformation detection means M36 is configured to detect that the surface filtration cake layer is formed again, and has grown to a preset extent at a time point where the PM trap efficiency ηy, which is obtained when the PM slip-through amount Y is calculated by the PM slip-through amount calculation means M34, exceeds a preset PM trap return efficiency ηyc.

The slip-through amount limiting means M30 is configured to cause the surface filtration cake layer formation enhancement control means M32 to select one of the retard control means M32a, the EGR rate increase control means M32b, and the air-fuel ratio richness control means M32c according to the operation condition of the engine, especially the magnitude of the engine torque, and perform the surface filtration cake layer formation enhancement control in which the PM generation amount X is increased, when the PM generation amount X calculated by the PM generation amount calculation means M33 does not exceed the preset acceptable PM generation amount Xc, and the PM slip-through amount Y calculated by the PM generation amount reduction control means M35 does not exceed the acceptable PM slip-through amount Yc, and also configured to cause the PM generation amount reduction control means M35 to perform the PM generation amount reduction control when the PM generation amount X calculated by the PM generation amount calculation means M33 exceeds the preset acceptable PM generation amount Xc, or when the PM slip-through amount Y calculated by the PM slip-through amount calculation means M34 exceeds the acceptable PM slip-through amount Yc.

Figure 3:
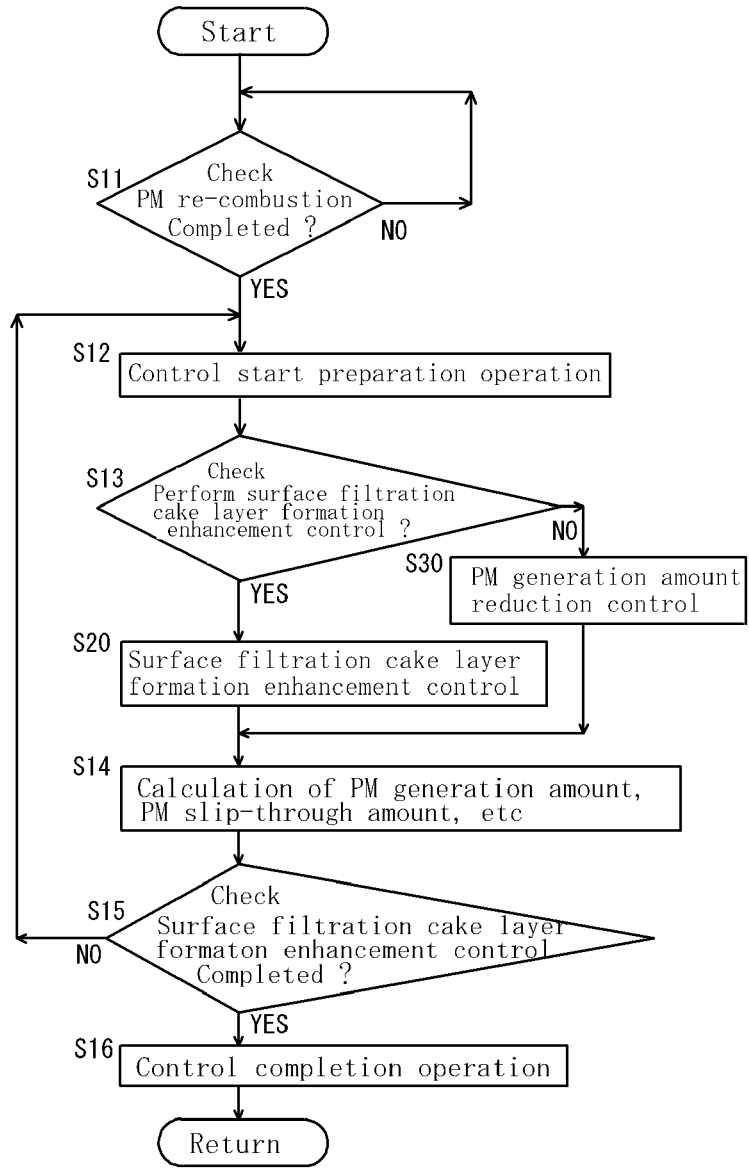
FIG. 3 shows an example of a control flow of an exhaust gas purification method of an embodiment according to the present invention.
Figure 4:
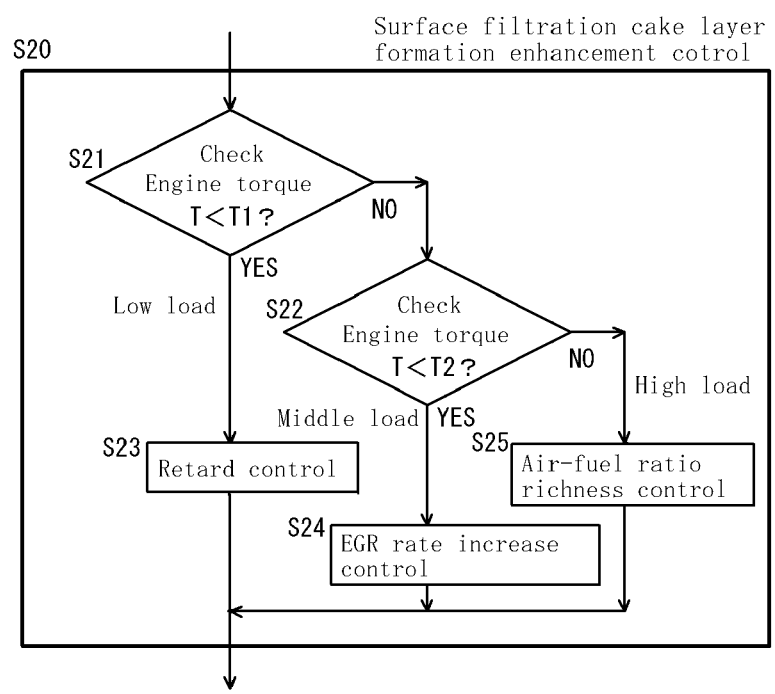
FIG. 4 shows details of a control step S20 in FIG. 3.

Next, an exhaust gas purification method in the above-described exhaust gas purification system 1 is described with reference to control flows shown in FIGS. 3 and 4. The control flow in FIG. 3 shows a control for preventing deterioration in emission performance due to the slip-through of PMs immediately after the PM re-combustion in the DPF 19b. When the engine 10 starts to operate, and the forced regeneration treatment of the DPF 19b is started under control of the exhaust gas purification system 1, the control flow in FIG. 3 is called by a control flow at a higher level and is started. In parallel with the forced regeneration treatment, which is the control flow at the higher level, each step in the control flows in FIGS. 3 and 4 is performed. Then, the process returns to the control flow at a higher level. When the forced regeneration treatment on the DPF 19b is started again, these control flows are performed in parallel with the forced regeneration treatment. These control flows are called repeatedly every time the forced regeneration treatment is performed. With the completion of the operation of the engine 10, the process returns to the control flow at the higher level, and the control is stopped.

When the control flow in FIG. 3 is called by the control flow at the higher level and started, the PM re-combustion completion detection means M31 determines whether the PM re-combustion is completed in Step S11. In Step S11, it is determined that the PM re-combustion is completed at a time point where a value ΔP detected by the differential pressure sensor 24 becomes smaller than a preset setting value ΔPc, or it is determined that the PM re-combustion is completed at a time point where the PM concentration difference ΔCpm across the DPF 19b or the PM trap efficiency ηy calculated from the PM concentration difference ΔCpm becomes smaller than the corresponding preset value ΔCpm1 or ηy1.

If it is determined that the PM re-combustion is not completed in Step S11 (NO), the process returns to Step S11 after a lapse of a preset first setting time (time having a relationship with the interval of the determination in Step S11) Δt1, and waits for the completion of the PM re-combustion. If it is determined that the PM re-combustion is completed in Step S11 (YES), the process goes to the subsequent Step S12. Note that, upon the completion of the PM re-combustion, the forced regeneration treatment in the DPF is stopped by the control flow at the higher level.

In the subsequent Step S12, a control start preparation operation is performed. In this control start preparation operation, an elapsed time to of the PM slip-through amount limiting control starts to be counted, and also the cumulative PM trap amount ΣZ is reset to zero. Then, the cumulative PM trap amount ΣZ, which is a cumulative value of the PM trap amount Z, starts to be calculated. In other words, the cumulative value of the PM trap amount starts to be counted immediately after the PM re-combustion.

In addition, the PM generation amount calculation means M33 calculates the PM generation amount X generated in the engine operation state, and moreover, the PM slip-through amount calculation means M34 calculates the PM slip-through amount Y through the DPF 19b. For the calculation of the PM slip-through amount Y, the PM trap efficiency ηy is found on the basis of the cumulative PM trap amount ΣZ with reference to the PM trap efficiency map data. Then, from the PM trap efficiency ηy and the PM generation amount X, the PM trap amount Z (=X×ηy) is calculated, and the PM slip-through amount Y (=X−Z)

trough the DPF 19b is calculated. Here, since the PM trap efficiency ηy varies depending on the cumulative PM trap amount ΣZ, ΣZ=0 is used when Step S12 is performed for the first time since the control flow in FIG. 3 is called. After that, the cumulative PM trap amount ΣZ calculated in Step S14 described later is used.

In the subsequent Step S13, it is determined whether the surface filtration cake layer formation enhancement control is to be performed. Specifically, it is determined whether the control for early formation of the surface filtration cake layer is to be performed. In other words, it is determined whether the PM generation amount X and the PM slip-through amount Y are within the acceptable ranges. In this determination, when the PM generation amount X calculated by the PM generation amount calculation means M33 does not exceed the preset acceptable PM generation amount Xc (X≤Xc), and the PM slip-through amount Y calculated by the PM slip-through amount calculation means M34 does not exceed the acceptable PM slip-through amount Yc (Y≤Yc), it is determined that the surface filtration cake layer formation enhancement control is to be performed (YES), and the process goes to the Step S20. In Step S20, the surface filtration cake layer formation enhancement control means M32 performs the surface filtration cake layer formation enhancement control for a preset second setting time (a time having a relationship with the interval of the determination in Step S13) Δt2, and the process goes to Step S14. In other words, the control for the early formation of the surface filtration cake layer is performed.

In addition, when the PM generation amount X exceeds the preset acceptable PM generation amount Xc (X>Xc), or when the PM slip-through amount Y exceeds the acceptable PM slip-through amount Yc (Y>Yc), it is determined that the surface filtration cake layer formation enhancement control is not to be performed (NO), and the process goes to Step S30. In Step S30, the PM generation amount reduction control means M35 performs the PM generation amount reduction control for a second setting time Δt2, and the process goes to Step S14. In other words, the PM slip-through amount Y is reduced by temporarily lowering the EGR rate. The range where the PM generation amount reduction control is performed is, for example, the hatched portion of the "PM deterioration region" on the lower left in the PM generation amount map during ordinary operation shown in FIG. 5.

Note that when one of the surface filtration cake layer formation enhancement control and the PM generation amount reduction control is selected, the other is stopped, and these controls are not performed simultaneously. Accordingly, when a control is selected for the first time by the determination in Step S13, the control is started. When the same control as the preceding control is selected, the control is continued. When a control different from the preceding control is selected, the control is switched to the newly selected control.

Then, as shown in FIG. 4, in the surface filtration cake layer formation enhancement control in Step S20, it is determined whether the engine torque T of the engine 10 is lower than the preset first setting value T1 in Step S21. When the engine torque T is lower, the engine torque T is determined to be in the low-load region, and the process goes to Step S23. In Step S23, the retard control means M32a performs the retard control for a preset third setting time (a time having a relationship with the second setting time and the intervals of the determinations in Steps S21 and S20) Δt3. Then, the process goes to Step S14 in the control flow in FIG. 3. In other words, while the temperature of the DPF 19b is monitored, the HC components in the exhaust gas G are increased by temporarily retarding the injection timing of the in-cylinder fuel injection after the temperature drops.

In Step S21, when the engine torque T is not lower than the first setting value T1, the process goes to Step S22, where it is determined whether the engine torque T is lower than the preset second setting value T2. When the engine torque T is lower, the engine torque T is determined to be in the middle-load region, and the process goes to Step S24. In Step S24, the EGR rate increase control means M32b performs the EGR rate increase control for a third setting time Δt3. Then, the process goes to Step S14 in the control flow in FIG. 3. In other words, the growth of the surface filtration cake layer is enhanced by increasing the EGR rate to slightly deteriorate the smoke.

When the engine torque T is not lower than the second setting value T2 in Step S22, the engine torque T is determined to be in the high-load region, and the process goes to Step S25. In Step S25, the air-fuel ratio richness control means M32c performs the air-fuel ratio richness control for the third setting time Δt3, and the process goes to Step S14 in the control flow in FIG. 3. In other words, while the temperature of the DPF 19b is monitored, the HC components in the exhaust gas G are increased by temporarily making the air-fuel ratio rich by rich-spike after the temperature drops.

Thus, when the engine torque T of the engine 10 is lower than the preset first setting value T1, the retard control can be performed; when the engine torque T is not lower than the first setting value T1 but lower than the preset second setting value T2, the EGR rate increase control can be performed; and when the engine torque T is not lower than the second setting value T2, the air-fuel ratio richness control can be performed.

Note that also when anyone of these controls is selected, the other controls are stopped, and these controls are not performed simultaneously. Accordingly, when a control is selected for the first time by the determination in Step S21 or S22, the control is started. When the same control as the preceding control is selected, the control is continued. When a control different from the preceding control is selected, the control is switched to the newly selected control.

In the surface filtration cake layer formation enhancement control, the growth of the surface filtration cake layer is enhanced by slightly deteriorating the smoke immediately after the PM re-combustion. In this case, the temporary deterioration of PMs also occurs, but the surface filtration cake layer is formed early on the wall surface of the DPF 19b. Hence, the total amount of the emission can be reduced. Here, PM generation amount databases as shown in FIGS. 5 to 8 are created in advance.

Then, in Step S14 in the control flow in FIG. 3, the PM generation amount calculation means M33 calculates the PM generation amount X during the implementation of the Step S20 or Step S30. In other words, the PM generation amount calculation means M33 calculates the PM generation amount X generated during the surface filtration cake layer formation enhancement control or the PM generation amount X generated during the PM generation amount reduction control. In addition, the PM slip-through amount calculation means M34 finds the PM trap efficiency ηy on the basis of the cumulative PM trap amount ΣZ, which is the cumulative value of the PM trap amount Z from the start of the counting at the elapsed time ta, with reference to the PM trap efficiency map data, then calculates the PM trap amount Z (=X×ηy) from the PM trap efficiency ηy and the PM generation amount X, and calculates the PM slip-through amount Y (=X−Z) through the DPF 19b.

Then, in the subsequent Step S15, it is determined whether the surface filtration cake layer formation enhancement control is completed. This determination is performed on the basis of the two criteria, namely, whether the elapsed time ta exceeds a preset setting time tc, and whether the surface filtration cake layer is formed again and has grown to a preset extent.

The setting time tc is a time during which the differential pressure across the DPF 19b is raised by about a differential pressure $\Delta\alpha$, which is set in advance as a determination criterion, to limit the period of the surface filtration cake layer formation enhancement control or the PM generation amount reduction control for limiting the PM slip-through amount only to a short period after the PM re-combustion. The setting time tc is set, for example, in a range from 3 minutes to 7 minutes (preferably about 5 minutes).

In Step S15, when either it is determined that the elapsed time ta exceeds the preset setting time tc (t≥tc), or the surface filtration cake layer reformation detection means M36 determines that the surface filtration cake layer is formed again and has grown to the preset extent, and the PM trap efficiency $\eta y$ exceeds the preset PM trap return efficiency $\eta yc$, it is determined that the surface filtration cake layer formation enhancement control is completed (YES), and the process goes to the control completion operation in Step S16.

Meanwhile, when the elapsed time ta does not exceed the preset setting time tc (t<Tc), and the surface filtration cake layer reformation detection means M36 does not determine that the surface filtration cake layer has grown to the preset extent, because the surface filtration cake layer is formed again, but the PM trap efficiency $\eta y$ does not exceed the preset PM trap return efficiency $\eta yc$, it is determined that the surface filtration cake layer formation enhancement control is not completed (NO), and the process returns to Step S12. Then, Steps S12 to S16 are repeated.

In the control completion operation in Step S16, the elapsed time ta is reset, and also the surface filtration cake layer formation enhancement control or the PM generation amount reduction control performed prior to Step S16 is stopped, and the control is returned to the ordinary operation control in which the EGR control or the timing control of the in-cylinder fuel injection is performed according to the engine operation conditions (engine rotation speed and engine torque) under the current situation. After completion of the control completion process Step S16, the process goes to Return, and returns to the control flow at the higher level. In this manner, the process completes the control flows in FIGS. 3 and 4, and waits for the next implementation of the subsequent forced regeneration treatment on the DPF 19b.

Note that when the engine 10 stops operating during a control, an interruption occurs. Even during a control, the process goes to Step S16, where the control completion operation is completed, and the process returns to the control flow at the higher level. With the completion of the control flow at the higher level, these control flows in FIGS. 3 and 4 are also terminated.

The above-described control makes it possible to temporarily perform the surface filtration cake layer formation enhancement control or the PM generation amount reduction control immediately after the PM re-combustion of the forced regeneration treatment on the DPF 19b in the exhaust gas purification method in which the exhaust gas G of the engine 10 is purified with the DPF 19b.

Accordingly, to cope with the phenomenon (blow-off) in which the amount (PM slip-through amount) Y of PMs passing through the DPF 19b temporarily increases, and the amount of PMs emitted to the atmosphere temporarily increases immediately after the PM re-combustion by the forced regeneration treatment of PMs in the DPF 19b, the early formation and growth of the surface filtration cake layer on the wall surface of the DPF 19b are enhanced immediately after the PM re-combustion of the forced regeneration treatment by the surface filtration cake layer formation enhancement control in which the PM generation amount X is increased from that in an ordinary operation during the period for which this phenomenon continues. Thus, the PM slip-through amount Y can be reduced, and the total amount of PMs emitted to the atmosphere can be reduced. In addition, the PM generation amount X from the engine 10 is reduced for a temporary period until the surface filtration cake layer has grown by the PM generation amount reduction control in which the PM generation amount X is increased from that in an ordinary operation. Thus, the amount of PMs flowing into the DPF 19b is reduced, and the PM slip-through amount Y through the DPF 19b is reduced, so that the total amount of PMs emitted to the atmosphere can be reduced.

In addition, in the exhaust gas purification method, any one of the PM generation amount increase control by increasing the EGR rate, the retard control in which the fuel injection timing is retarded in in-cylinder fuel injection, or the air-fuel ratio richness control in which the air-fuel ratio is made rich in in-cylinder fuel injection can be performed as the surface filtration cake layer formation enhancement control.

Accordingly, in the case of the control for increasing the PM generation amount X by increasing the EGR rate, the in-cylinder combustion temperature in a cylinder, the exhaust gas temperature, and the DPF temperature are lowered by increasing the EGR rate, and the PM generation amount X is increased. Thus, the formation of the surface filtration cake layer can be enhanced because of the increase in the PM trap efficiency $\eta y$ by the DPF 19b.

Meanwhile, in each of the retard control in which the fuel injection timing is retarded in in-cylinder fuel injection and the air-fuel ratio richness control (rich-spike control or the like) in which the air-fuel ratio is made rich in in-cylinder fuel injection, the HC components (hydrocarbon components) in the exhaust gas G are increased by the control, and the HCs are attached to the PMs to increase the particle diameters. This can facilitate the trapping of the PMs on the wall surface of the DPF 19b. Thus, the formation of the surface filtration cake layer can be enhanced.

In addition, in the exhaust gas purification method, the PM generation amount limiting control by decreasing the EGR rate can be performed as the PM generation amount reduction control. Accordingly, by the PM generation amount limiting control by decreasing the EGR rate, the in-cylinder combustion temperature is raised, and the PM generation amount is reduced, so that the PM slip-through amount Y through the DPF 19b can be reduced. Thus, until the surface filtration cake layer is formed to some extent, the PM slip-through amount Y can be limited.

Moreover, in the surface filtration cake layer formation enhancement control in the exhaust gas purification method, the retard control can be performed when the engine torque T of the engine 10 is lower than the preset first setting value T1; the EGR rate increase control can be performed when the engine torque T is not lower than the first setting value T1 but lower than the preset second setting value T2; and the air-fuel ratio richness control can be performed when the engine torque T is not lower than the second setting value T2.

Accordingly, an optimum surface filtration cake layer formation enhancement control can be selected according to the engine torque (engine output) T of the engine 10. Hence, while adverse influences on the engine torque T and the emission performance are reduced, the formation of the surface filtration cake layer can be enhanced efficiently, and the total amount of PMs emitted to the atmosphere can be reduced.

In addition, in the exhaust gas purification method, the PM generation amount reduction control can be performed when the PM generation amount X, which is the amount of PMs generated in the engine 10 immediately after the PM re-combustion of the forced regeneration treatment on the DPF 19b exceeds the preset acceptable PM generation amount Xc, or when the PM slip-through amount Y, which is the amount of PMs passing through the DPF 19b, exceeds the preset acceptable PM slip-through amount Yc. Accordingly, the PM generation amount reduction control is performed on the basis of the PM generation amount X or the PM slip-through amount Y, and hence the total amount of PMs emitted to the atmosphere can be reduced reliably.

Figure 10:
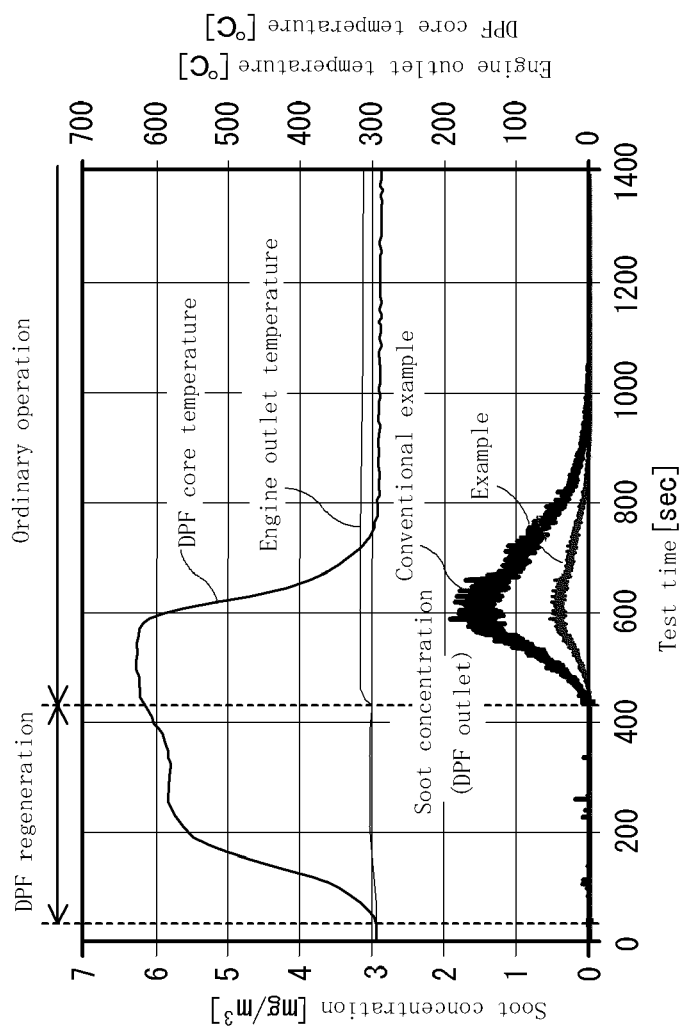
FIG. 10 shows an example of a time series of a PM slip-through amount (soot concentration) in an Example and a Conventional Example.
Figure 11:
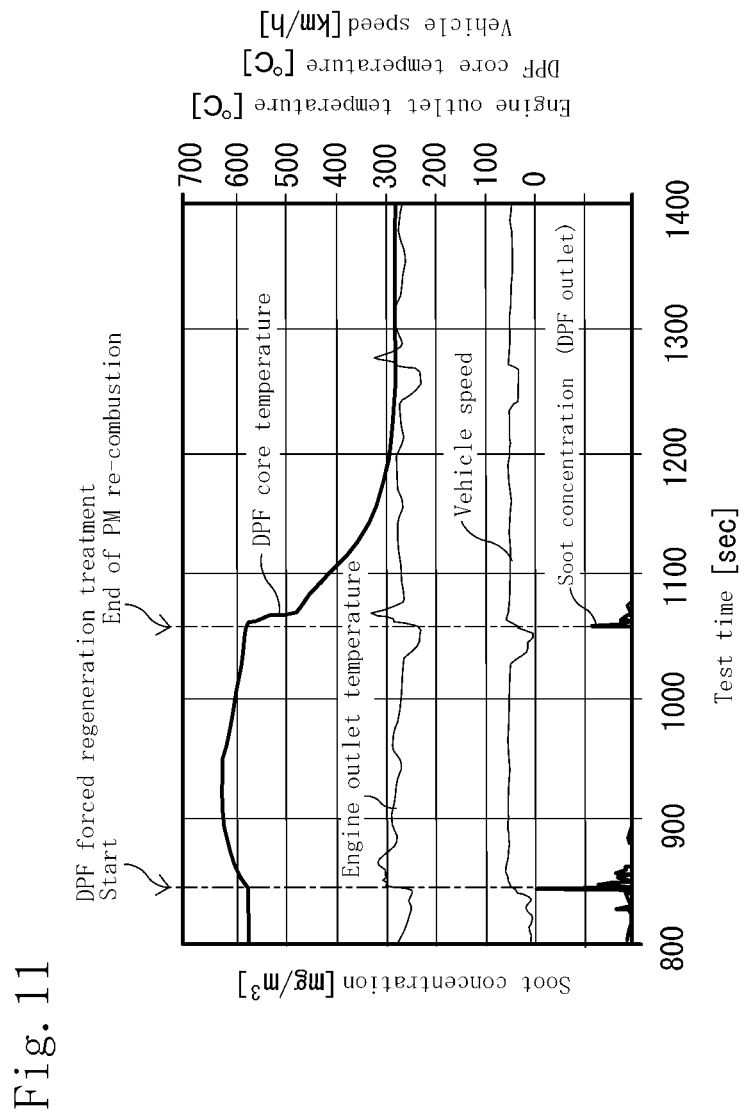
FIG. 11 shows an example of a time series of a PM slip-through amount (DPF outlet soot concentration) after forced regeneration of a DPF of a conventional technology.

Next, effects of the present invention are described by using FIG. 10. FIG. 10 shows an example of a time series of the PM slip-through amount Y in each of an Example of the present invention and a Conventional Example of a conventional technology. A comparison between the DPF outlet soot concentration (PM slip-through amount) in the "Example" in which the cake layer formation enhancement was performed immediately after the forced regeneration treatment on the DPF 19b (with the test time on the horizontal axis being about 420 seconds to 800 seconds) and the DPF outlet soot concentration of the conventional technology shows that the DPF outlet soot concentration was reduced in the Example to about ⅓ of that in the Conventional Example. It can be understood that the PM slip-through amount Y was successfully reduced immediately after the forced regeneration treatment on the DPF 19b, and the total amount of PMs emitted to the outside air can be reduced in Example.

Accordingly, according to the exhaust gas purification system 1 and the exhaust gas purification method configured as described above, which are directed to the PM slip-through (blow-off) phenomenon in which the PM slip-through amount Y temporarily increases immediately after the PM re-combustion of the forced regeneration treatment on the DPF 19b in the exhaust gas purification system 1 including the DPF 19b disposed in the exhaust passage 13 of the engine 10, the early reformation and growth of the surface filtration cake layer on the wall surface of the DPF 19b are temporarily enhanced by the surface filtration cake layer formation enhancement control in which the PM generation amount X is increased, or the PM generation amount X in the engine 10 is reduced, and the amount of PMs flowing into the DPF 19b is reduced by the PM generation amount reduction control in which the PM generation amount X is reduced for a temporary period until the surface filtration cake layer is formed again and has grown. Thus, the total amount of PMs emitted to the atmosphere can be reduced immediately after the PM re-combustion of the forced regeneration treatment on the DPF 19b, and the total amount of PMs emitted to the atmosphere can be reduced.

According to the exhaust gas purification system and the exhaust gas purification method of the present invention, which are directed to the PM slip-through (blow-off) phenomenon in which the PM slip-through amount temporarily increases immediately after the PM re-combustion of the forced regeneration treatment on a DPF in an exhaust gas purification system including the DPF disposed in an exhaust passage of an internal combustion engine, the total amount of PMs emitted to the atmosphere can be reduced immediately after the PM re-combustion of the forced regeneration treatment of the DPF, and the total amount of PMs emitted to the atmosphere can be reduced. Hence, the exhaust gas purification system and the exhaust gas purification method of the present invention can be used for internal combustion engines mounted on automobiles, and the like.

The invention claimed is:

1. An exhaust gas purification system comprising:
   a diesel particulate filter disposed in an exhaust passage of an internal combustion engine; and
   a controller configured to
      determine a particulate amount generated in the internal combustion engine by comparing a preset particulate matter generation amount database with a detected engine operation state,
      determine a particulate matter slip amount passing through the diesel particulate filter by comparing the preset particulate matter generation amount database with a preset particulate matter trap efficiency database,
   recombust particulate matter using a forced regeneration treatment of the diesel particulate filter, and
   temporarily perform a surface filtration cake layer formation enhancement control or a particulate matter generation amount reduction control based on the determined particulate matter generation amount and the determined particulate matter slip-through amount, immediately after the particulate matter re-combustion using the forced regeneration treatment on the diesel particulate filter,
      wherein, when both the determined particulate matter generation amount and the determined particulate matter slip-through amount are smaller than respective preset thresholds, the surface filtration cake layer formation enhancement control is performed.

2. The exhaust gas purification system according to claim 1,
   wherein the surface filtration cake layer formation enhancement control includes performing one of a particulate matter generation amount increase control by increasing an exhaust gas recirculation rate, a retard control in which fuel injection timing is retarded in in-cylinder fuel injection, or an air-fuel ratio richness control in which an air-fuel ratio is made rich in in-cylinder fuel injection.

3. The exhaust gas purification system according to claim 2,
   wherein the retard control is performed, when an engine torque of the internal combustion engine is lower than a preset first setting value,
   the exhaust gas recirculation rate increase control is performed, when the engine torque is not lower than the preset first setting value but lower than a preset second setting value, and
   the air-fuel ratio richness control is performed, when the engine torque is not lower than the preset second setting value.

4. The exhaust gas purification system according to claim 2, wherein the particulate matter generation amount reduction control is a particulate matter generation amount limiting control performed by decreasing an exhaust gas recirculation rate.

5. The exhaust gas purification system according to claim 1,
wherein the particulate matter generation amount reduction control is a particulate matter generation amount limiting control by decreasing an exhaust gas recirculation rate.

6. The exhaust gas purification system according to claim 5,
wherein the retard control is performed, when an engine torque of the internal combustion engine is lower than a preset first setting value,
the exhaust gas recirculation rate increase control is performed, when the engine torque is not lower than the preset first setting value but lower than a preset second setting value, and
the air-fuel ratio richness control is performed, when the engine torque is not lower than the preset second setting value.

7. An exhaust gas purification method, comprising:
purifying exhaust gas of an internal combustion engine with a diesel particulate filter;
performing particulate matter re-combustion by a forced regeneration treatment on the diesel particulate filter;
determining a particulate matter amount generated in the internal combustion engine by comparing a preset particulate matter generation amount database with a detected engine operation state;
determining a particulate matter slip through amount passing through the diesel particulate filter by comparing the preset particulate matter generation amount database with a preset particulate matter trap efficiency database; and
temporarily performing a surface filtration cake layer formation enhancement control or a particulate matter generation amount reduction control based on the determined particulate matter generation amount and the determined particulate matter slip-through amount immediately after the particulate matter re-combustion by the forced regeneration treatment on the diesel particulate filter,
wherein, when both the determined particulate matter generation amount and the determined particulate matter slip-through amount are smaller than respective preset thresholds, the surface filtration cake layer formation enhancement control is performed.

8. The exhaust gas purification method according to claim 7,
wherein the temporarily performing the surface filtration cake layer formation control includes one of a particulate matter generation amount increase control by increasing an exhaust gas recirculation rate, a retard control in which fuel injection timing is retarded in in-cylinder fuel injection, or an air-fuel ratio richness control in which an air-fuel ratio is made rich in in-cylinder fuel injection is performed as the surface filtration cake layer formation enhancement control.

9. The exhaust gas purification method according to claim 8,
wherein the retard control is performed, when an engine torque of the internal combustion engine is lower than a preset first setting value,
the exhaust gas recirculation rate increase control is performed, when the engine torque is not lower than the preset first setting value but lower than a preset second setting value, and
the air-fuel ratio richness control is performed, when the engine torque is not lower than the preset second setting value.

10. The exhaust gas purification method according to claim 8, further comprising:
wherein a particulate matter generation amount limiting control by decreasing an exhaust gas recirculation rate is performed as the particulate matter generation amount reduction control.

11. The exhaust gas purification method according to claim 7, further comprising:
performing, as the particulate matter generation amount reduction control, a particulate matter generation amount limiting control by decreasing an exhaust gas recirculation rate.

12. The exhaust gas purification method according to claim 11,
wherein the retard control is performed, when an engine torque of the internal combustion engine is lower than a preset first setting value,
the exhaust gas recirculation rate increase control is performed, when the engine torque is not lower than the preset first setting value but lower than a preset second setting value, and
the air-fuel ratio richness control is performed, when the engine torque is not lower than the preset second setting value.

13. An exhaust gas purification system comprising:
a diesel particulate filter disposed in an exhaust passage of an internal combustion engine,
wherein a surface filtration cake layer formation enhancement control or a particulate matter generation amount reduction control is temporarily performed immediately after particulate matter re-combustion in a forced regeneration treatment on the diesel particulate filter,
wherein the surface filtration cake layer formation enhancement control is one of a particulate matter generation amount increase control by increasing an exhaust gas recirculation rate, a retard control in which fuel injection timing is retarded in in-cylinder fuel injection, or an air-fuel ratio richness control in which an air-fuel ratio is made rich in in-cylinder fuel injection,
wherein the retard control is performed, when an engine torque of the internal combustion engine is lower than a preset first setting value,
the exhaust gas recirculation rate increase control is performed, when the engine torque is not lower than the preset first setting value but lower than a preset second setting value, and
the air-fuel ratio richness control is performed, when the engine torque is not lower than the preset second setting value, and
wherein the particulate matter generation amount reduction control is a particulate matter generation amount limiting control by decreasing an exhaust gas recirculation rate.

* * * * *